United States Patent
Ruiz et al.

(10) Patent No.: US 10,059,160 B2
(45) Date of Patent: Aug. 28, 2018

(54) TRAILER COUPLER

(71) Applicant: Ford Global Technologies, LLC, Dearborn, MI (US)

(72) Inventors: J Elias Ruiz, Atizapan (MX); Jhammel Montes, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 141 days.

(21) Appl. No.: 15/292,066

(22) Filed: Oct. 12, 2016

(65) Prior Publication Data
US 2018/0099537 A1 Apr. 12, 2018

(51) Int. Cl.
| | | |
|---|---|---|
| B60D 1/64 | (2006.01) | |
| B60D 1/24 | (2006.01) | |
| B60D 1/06 | (2006.01) | |
| H01R 35/04 | (2006.01) | |
| H01R 24/38 | (2011.01) | |
| H01R 107/00 | (2006.01) | |

(52) U.S. Cl.
CPC ............... *B60D 1/64* (2013.01); *B60D 1/065* (2013.01); *B60D 1/24* (2013.01); *H01R 24/38* (2013.01); *H01R 35/04* (2013.01); *H01R 2107/00* (2013.01); *H01R 2201/26* (2013.01)

(58) Field of Classification Search
CPC . B60D 1/62; B60D 1/64; B60D 1/065; B60D 1/24; B60D 1/06; H01R 24/38; H01R 35/04; H01R 2201/26
See application file for complete search history.

(56) References Cited

U.S. PATENT DOCUMENTS

| | | | | |
|---|---|---|---|---|
| 1,926,264 A | * | 9/1933 | Connors | B60D 1/62 |
| | | | | 280/422 |
| 2,457,478 A | | 5/1946 | Letvin | |
| 2,564,520 A | * | 8/1951 | Blasdell | B60D 1/065 |
| | | | | 280/400 |
| 3,116,940 A | * | 1/1964 | Jinesa | B60D 1/62 |
| | | | | 280/422 |
| 3,181,887 A | | 5/1965 | Boylan | |

(Continued)

FOREIGN PATENT DOCUMENTS

| | | |
|---|---|---|
| DE | 10021232 A1 | 10/2001 |
| DE | 102011079632 A1 | 1/2013 |

(Continued)

OTHER PUBLICATIONS

Embedded trailer tow connector for trailer bail and coupler—Jesus Elias Ruiz/Jhammel Montes.

(Continued)

*Primary Examiner* — Anne Marie M Boehler
*Assistant Examiner* — Michael R Stabley
(74) *Attorney, Agent, or Firm* — James P. Muraff; Neal, Gerber & Eisenberg LLP (57) ABSTRACT

A coupler assembly for a trailer hitch includes: a pin extender comprising electrical pins and first slots; a pin receiver comprising pin slots and second and third slots; a housing comprising fourth slots; first stabilizers disposed in the first and second slots; second stabilizers disposed in the third and fourth slots. Each stabilizer includes a spring and a solid head, and the electrical pins are disposed in the pin slots.

20 Claims, 9 Drawing Sheets

(56) References Cited

U.S. PATENT DOCUMENTS

| | | | | |
|---|---|---|---|---|
| 3,328,741 A * | 6/1967 | Brown | ............... | B60D 1/065 |
| | | | | 280/422 |
| 3,858,907 A * | 1/1975 | Van Raden | ............ | B60D 1/065 |
| | | | | 280/422 |
| 4,283,072 A * | 8/1981 | Deloach, Jr. | ............ | B60D 1/06 |
| | | | | 200/61.58 R |
| 4,319,766 A * | 3/1982 | Corteg | ............... | B60D 1/248 |
| | | | | 280/432 |
| 4,568,098 A | 2/1986 | Landry, Jr. | | |
| 6,447,302 B1 * | 9/2002 | Davis | ............... | H01R 29/00 |
| | | | | 439/34 |
| 6,481,738 B1 * | 11/2002 | Duncan | ............... | B60D 1/06 |
| | | | | 280/420 |
| 6,544,069 B1 * | 4/2003 | Enriquez, Sr. | ............ | H01R 35/04 |
| | | | | 439/534 |
| 7,032,920 B1 * | 4/2006 | Peng | ............... | B60D 1/06 |
| | | | | 280/511 |
| 7,291,017 B1 * | 11/2007 | Fain | ............... | B60D 1/62 |
| | | | | 307/10.1 |
| 7,850,191 B1 * | 12/2010 | Kaminski | ............ | B60D 1/64 |
| | | | | 280/420 |
| 8,262,119 B2 * | 9/2012 | Glazner | ............ | B60D 1/015 |
| | | | | 280/420 |
| 8,308,181 B2 * | 11/2012 | Riibe | ............... | B60D 1/62 |
| | | | | 280/422 |
| 9,120,358 B2 * | 9/2015 | Motts | ............... | B60D 1/06 |
| 2006/0170194 A1 * | 8/2006 | Coy | ............... | B60D 1/06 |
| | | | | 280/507 |
| 2009/0108568 A1 * | 4/2009 | Drake | ............ | B60D 1/065 |
| | | | | 280/511 |
| 2009/0127825 A1 * | 5/2009 | Drake | ............ | B60D 1/065 |
| | | | | 280/477 |
| 2011/0127752 A1 * | 6/2011 | Drake | ............ | B60D 1/065 |
| | | | | 280/504 |
| 2015/0270640 A1 * | 9/2015 | Thomas | ............ | H01R 13/623 |
| | | | | 439/277 |
| 2016/0137270 A1 * | 5/2016 | Sturges | ............ | B63B 21/04 |
| | | | | 114/253 |

FOREIGN PATENT DOCUMENTS

| | | |
|---|---|---|
| FR | 2831857 A1 | 5/2003 |
| GB | 2363262 A | 12/2001 |
| WO | WO 2009003200 A1 | 12/2008 |

OTHER PUBLICATIONS http://chuxtrux.com/n-5049-towing-105-trailer-wiring-harness-explained.html.
Search Report dated Mar. 8, 2018 for GB Patent Application No. 1716089.6 (4 pages).

* cited by examiner

TRAILER COUPLER

TECHNICAL FIELD

This disclosure relates to a coupling between a vehicle and a trailer.

BACKGROUND

When pulling a trailer, a vehicle must be in bi-directional electronic communication with the trailer to, among other things, (a) receive sensor readings from the trailer, and (b) instruct the trailer to actuate various components of the trailer. For example, the vehicle may instruct the trailer to turn on a turn signal or apply brakes. The bi-directional electronic communication occurs via a coupling that joins or couples wires extending from the vehicle with wires extending from the trailer. Prior art couplings are (a) difficult to connect, (b) susceptible to decoupling when the vehicle moves with respect to the trailer (e.g., when the vehicle hits a bump).

SUMMARY

A solution is presented in the form of a coupler assembly for a trailer hitch that includes: a pin extender comprising electrical pins and first slots; a pin receiver comprising pin slots and second and third slots; a housing comprising fourth slots; first stabilizers disposed in the first and second slots; second stabilizers disposed in the third and fourth slots. Each stabilizer comprises a spring and a solid head, and the electrical pins are disposed in the pin slots.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 5 is an exploded perspective view of the complete coupler assembly. FIG. 5 includes a front perspective view of a pin receiver.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

Figure 6:
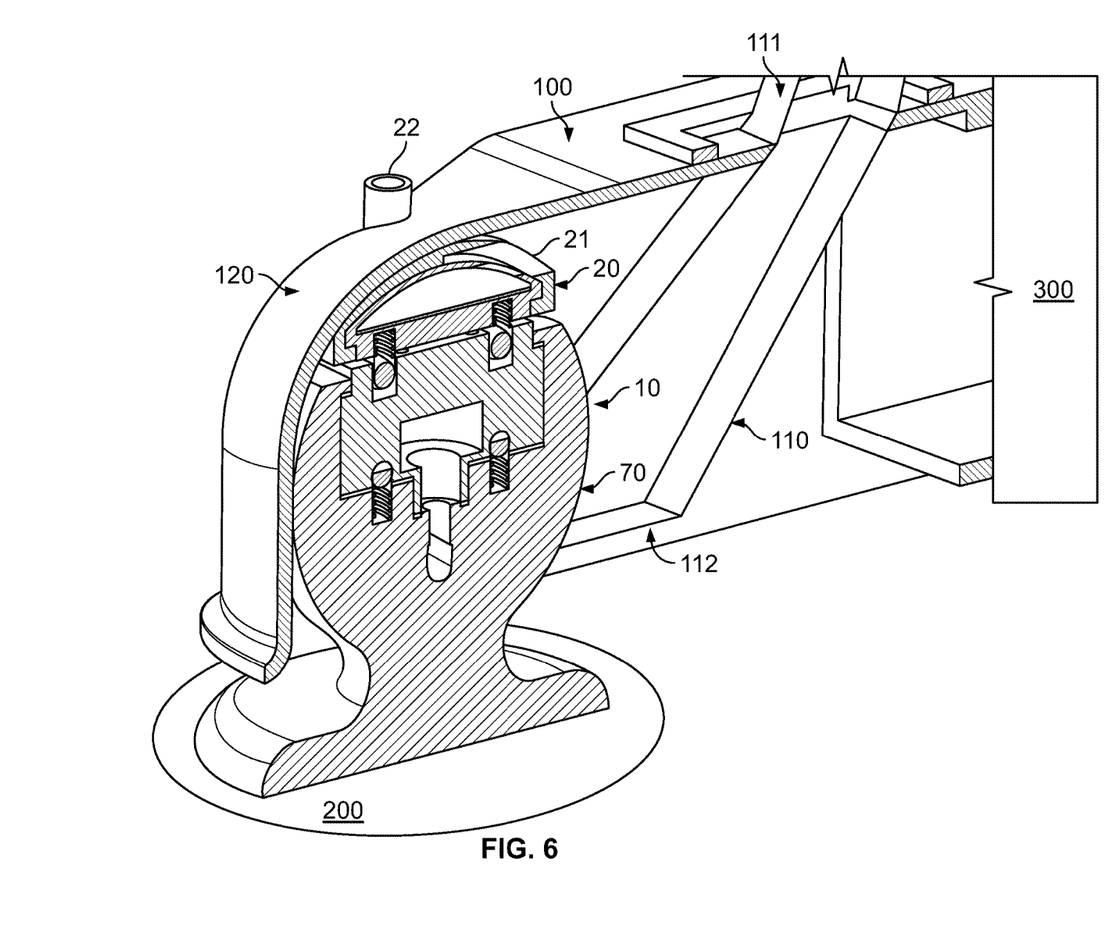
FIG. 6 is a cross sectional perspective view of the coupler assembly connected with a vehicle, a trailer hitch of the vehicle, and a trailer. Certain features of the coupler assembly (e.g., the pins) have been removed for clarity.
Figure 7:
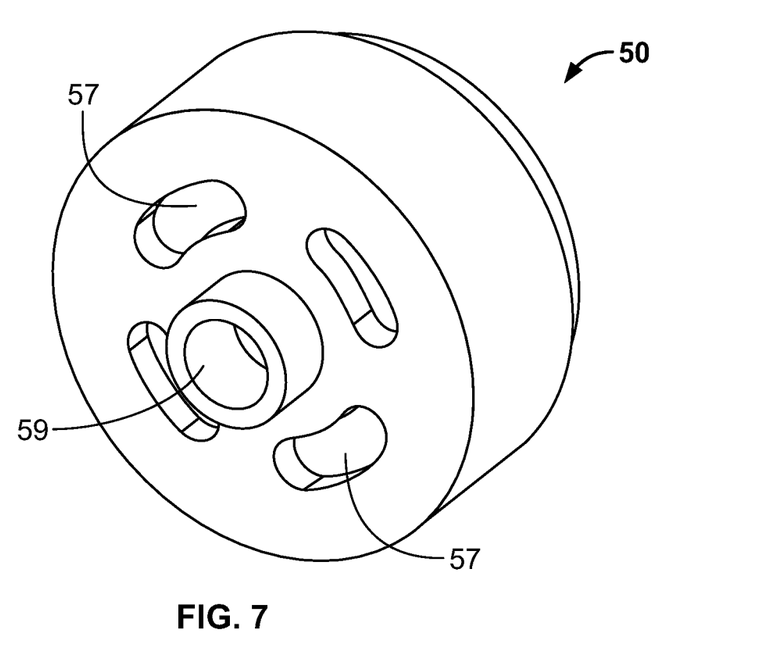
FIG. 7 is a rear perspective view of the pin receiver.

FIG. 6 is a cross sectional view of a coupler 10 connected to both a trailer 200 and a vehicle 300. It should be appreciated that FIG. 6 does not show certain features of the coupler 10 for clarity. The vehicle 300 includes a trailer hitch 100.

The trailer hitch 100 includes a latch 110. The latch 110 mechanically secures the trailer 200 to the vehicle 300. The latch 110 enables rotation of the vehicle 300 with respect to the trailer 200. A first end 111 of the latch 110 protrudes through a hole defined in the trailer hitch. A second end 112 of the latch 110 either (a) is secured to the trailer 200 or (b) is secured to a side of the coupler 10 (and specifically a side of spherical portion 73 of cup 70). If the second end 112 of the latch 110 is secured to the side of the coupler, then the trailer hitch 100 and/or the latch 110 includes an assembly suitable for selectively joining the second end 112 of the latch 110 to the cup 70.

According to some embodiments, the coupler 10 serves as the primary mechanical connection between the trailer 200 and the vehicle 300. According to these embodiments, the latch 110 may be absent.

According to some of the above-described embodiments, the vehicle 300, the trailer hitch 100, the top 20, the pin extender 30, the first stabilizers 40, and the pin receiver 50 rotate as a unit with respect to the second stabilizers 60, the cup 70, and the trailer 200.

The coupler 10 is configured to enable electric communication between the trailer 200 and the vehicle 300 while the latch 110 keeps the trailer 200 and the vehicle 300 mechanically secured. If the second end 112 of the latch 110 secures to the coupler 10, then the cup transmits mechanical force from latch 110 to trailer 200.

Figure 5:
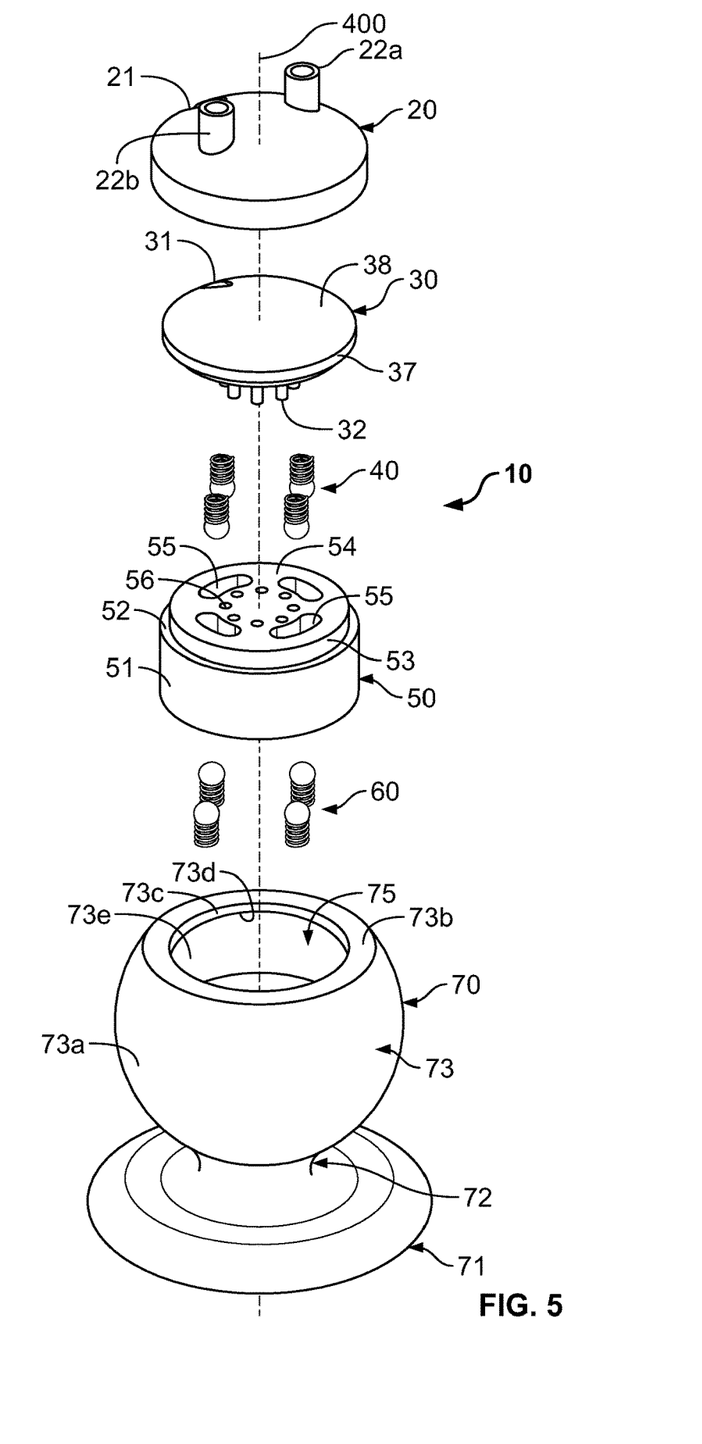

FIG. 5 is an exploded perspective view of the coupler 10. The coupler 10 includes a top 20, a pin extender 30, a plurality of first stabilizers 40, a pin receiver 50, a plurality of second stabilizers 60, and the cup 70. Wires (not shown) connected to the vehicle 300 fit through the top and electrically communicate with pins 32 of the pin extender 30. The pins 32 of the pin extender 30 electrically communicate with leads (not labeled) disposed in the bottoms of pin slots 56. The leads of the pin slots 56 electrically communicate with wires extending through the pin receiver 50 and the cup 70. These wires electrically communicate with the trailer 200.

The top 20 is cylindrical, includes masts 22, and defines a first wire slot 21. As shown in FIG. 6, the masts 22 extend through mast recesses defined in the trailer hitch 100. The top 20 accepts wires connected to the vehicle 300 via holes centrally defined in the masts 22 and/or via the wire slot 21. According to some embodiments, the masts 22 align the top 20 with respect to the trailer hitch 100. Put differently, the mast recesses defined in the trailer hitch 100 are sized and configured to only accept both masts 22 when the top 20 has been correctly aligned. Each of the masts 22 is radially spaced an equal distance from a centerline 400. Each of the masts 22 is also diametrically opposed across the centerline 400.

Figure 2:
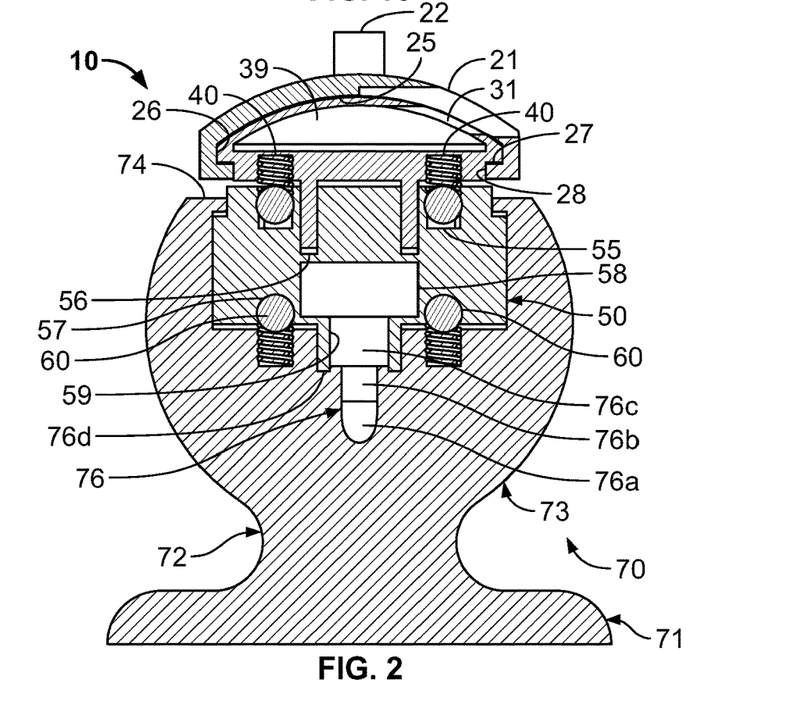
FIG. 2 is a cross sectional side view of the complete coupler assembly. Cross hatching has been removed to better illustrate features of the invention.
Figure 3A:
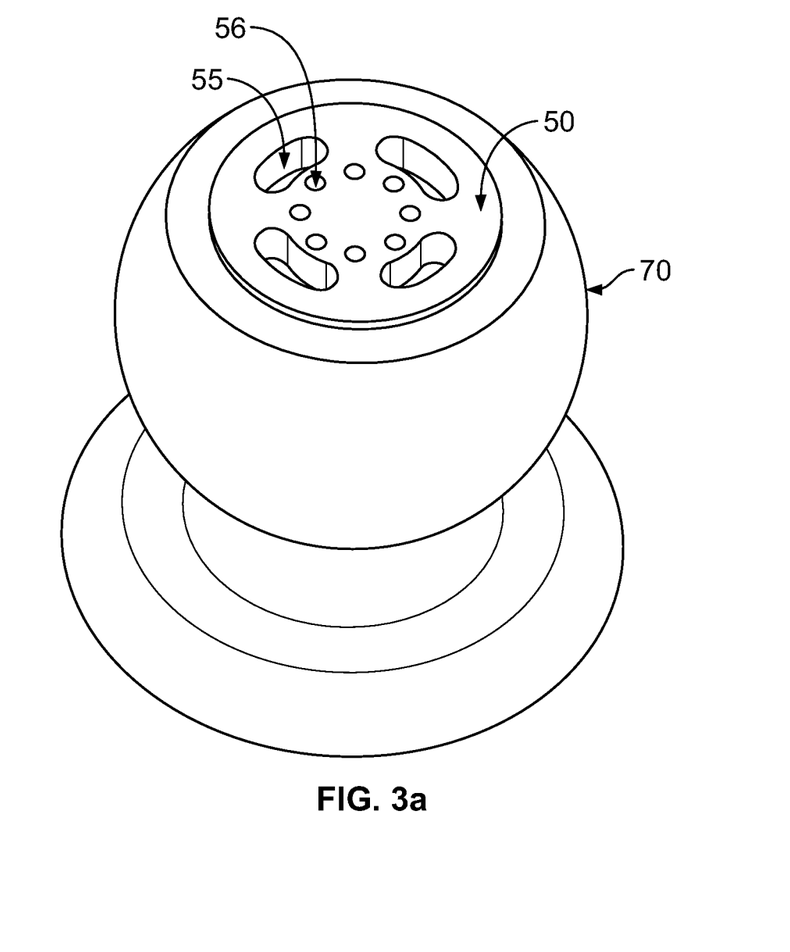
FIG. 3a is a perspective view of a portion of the coupler assembly.
Figure 3B:
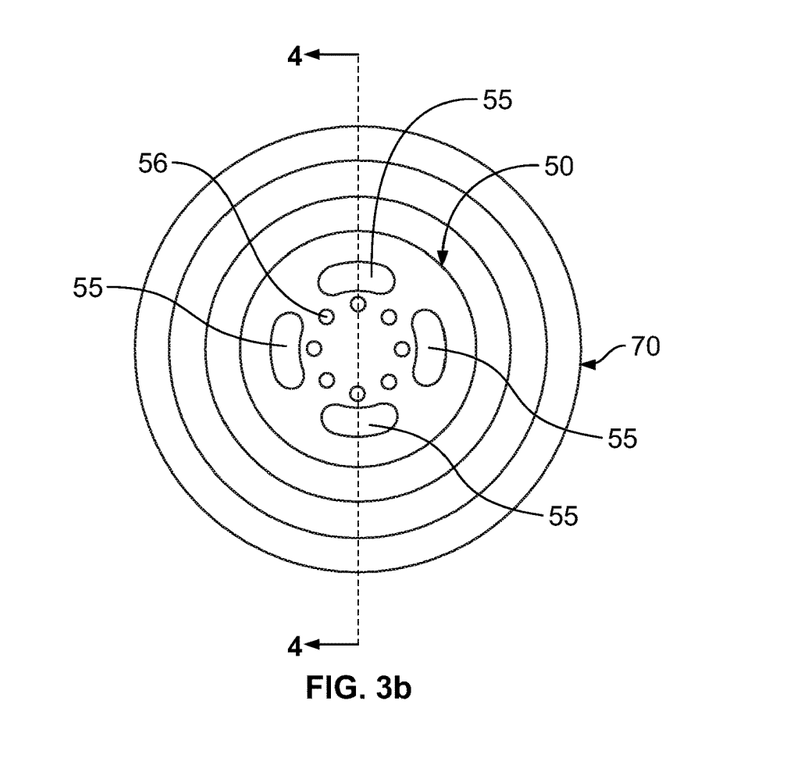
FIG. 3b is a top plan view of the portion of the coupler assembly.
Figure 4:
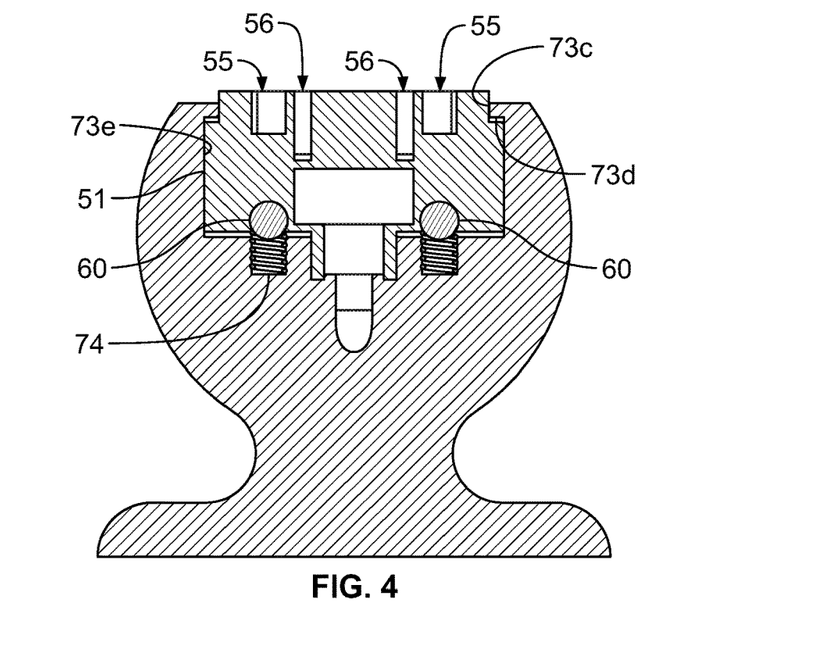
FIG. 4 is a cross sectional side view of the portion of the coupler assembly.
Figure 8:
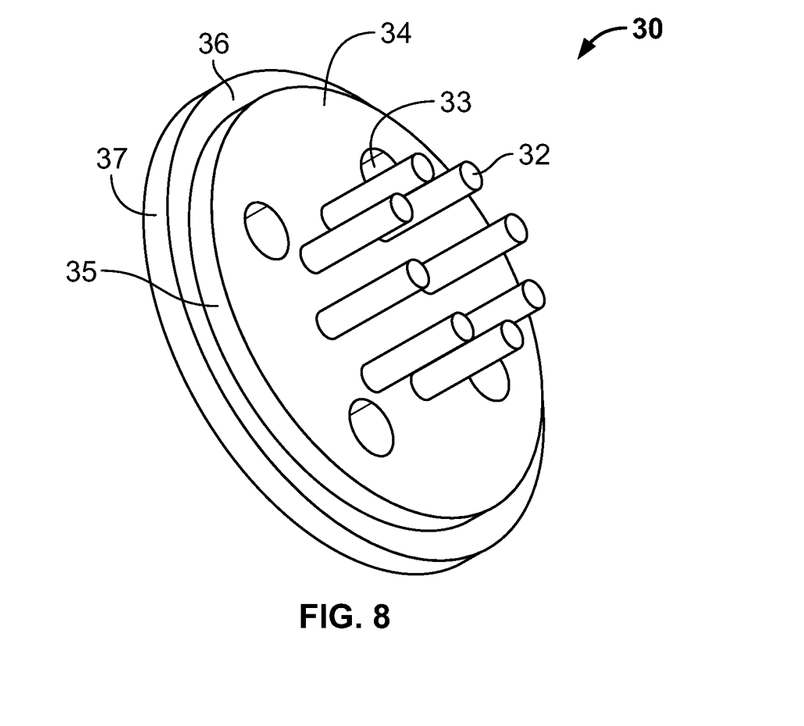
FIG. 8 is a perspective view of a pin extender.

As shown in FIGS. 2, 5, and 8, the pin extender 30 defines a second wire slot 31. The second wire slot 31 enables wires extending through the first wire slot to reach inside the pin extender 30. The pin extender 30 includes a plurality of pins 32 extending from a flat first surface 34. The pin extender 30 defines a plurality of first stabilizer slots 33. The pin extender 30 includes a ring shaped second surface 35 extending from the flat first surface until reaching a ring shaped third surface 36. The ring shaped third surface 36 meets a ring shaped fourth surface 37 along a circumferential edge. The ring shaped fourth surface 37 meets a curved upper surface 38 along an edge. The curved upper surface 38 defines the second wire slot 31.

The curved upper surface 38 further defines a dome-shaped inner void 39. The dome-shaped inner void 39 includes attachment points for the wires extending from the vehicle 300. The attachment points enable bidirectional electric communication between the wires and the pins 32. The attachment points may be solders. Each wire electrically communicates with a single pin 32.

Figure 1A:
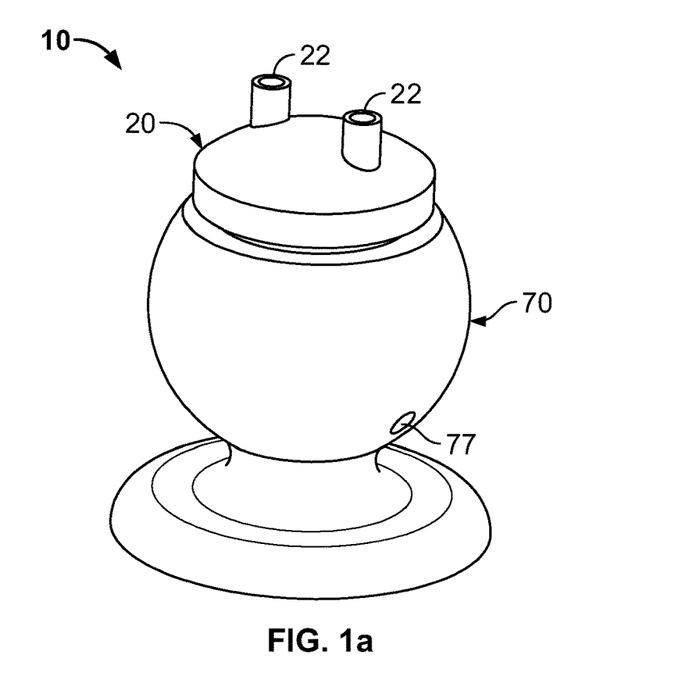
FIG. 1a is a perspective view of the complete coupler assembly.
Figure 1B:
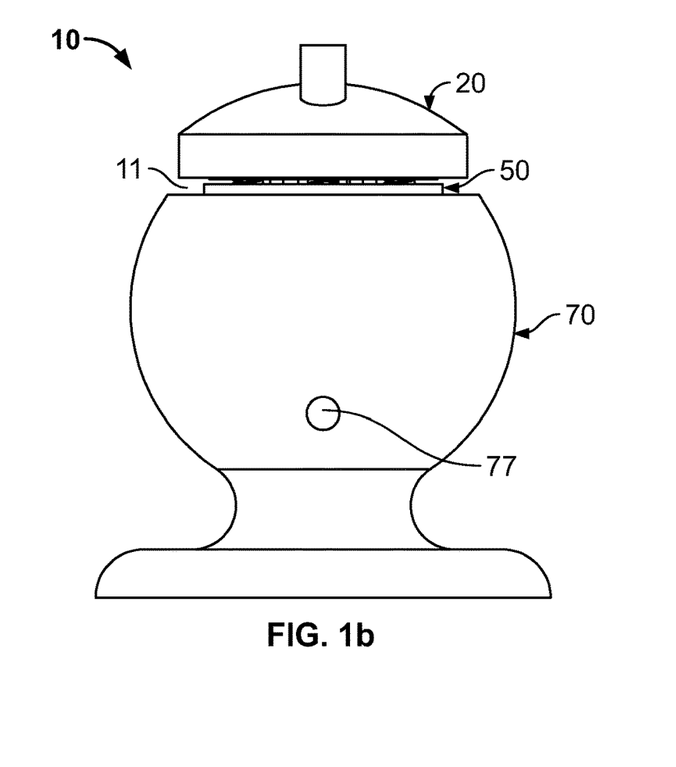
FIG. 1b is a side plan view of the complete coupler assembly.
Figure 1C:
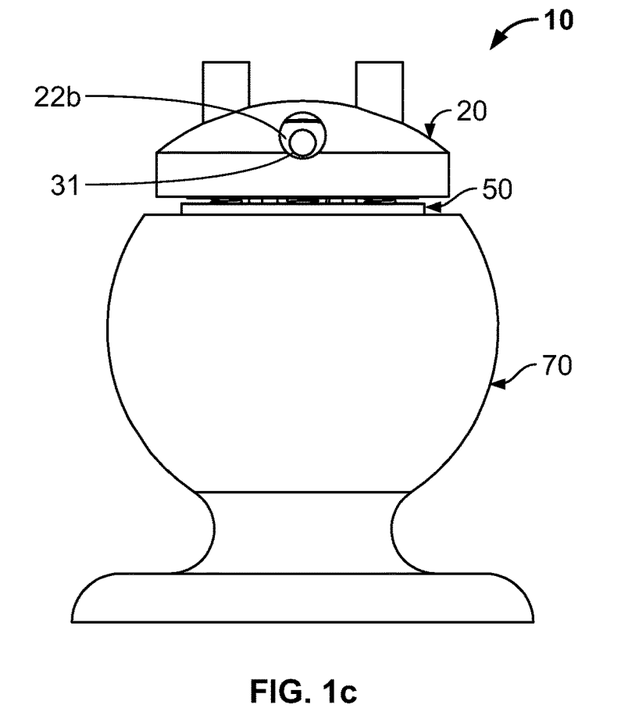
FIG. 1c is a side plan view of the complete coupler assembly.
Figure 1D:
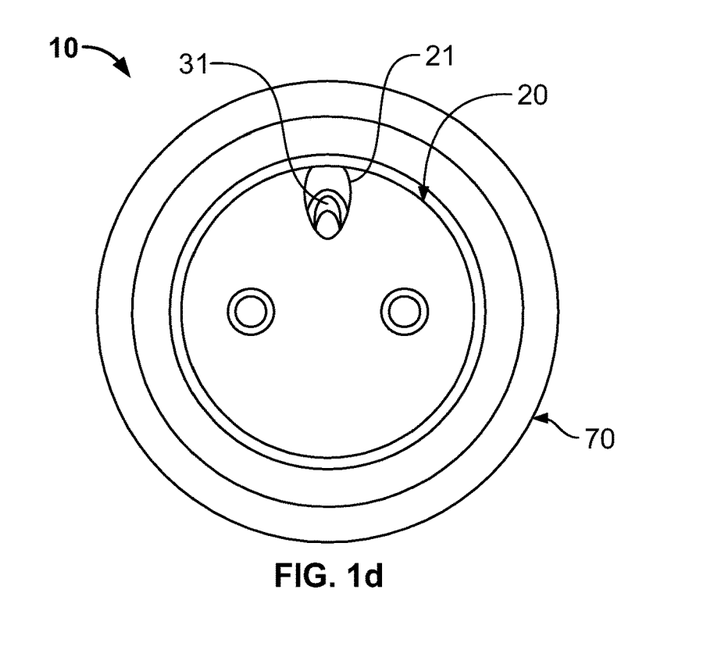
FIG. 1d is a top plan view of the complete coupler assembly.
Figure 1E:
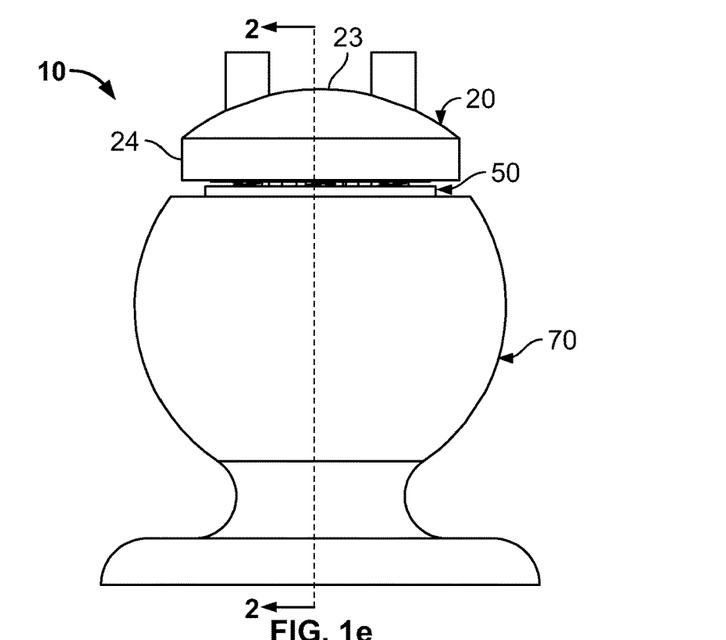
FIG. 1e is a side plan view of the complete coupler assembly.

As shown in FIG. 1e, the exterior of the top 20 includes a curved upper surface 23, which defines the wire slot 21 and through which the masts 22 extend. The exterior of the top 20 includes a cylindrical lower surface 24. As shown in FIG. 2, the top 20 defines a dome-shaped inner pin extender void (not labeled) sized to receive the pin extender 30. As shown in FIG. 2, the following inner surfaces of the top 20 at least partially define the dome-shaped inner pin extender void: (a) a curved upper surface 25; (b) a ring shaped intermediate surface 26 meeting the curved upper surface 25 along a circumferential edge; (c) a ring shaped lower intermediate surface 27 meeting the ring shaped intermediate surface 26 along a circumferential edge; (d) a ring shaped lower surface 28 meeting the ring shaped lower intermediate surface 27 along a circumferential edge.

As shown in FIG. 2, the top 20 holds the pin extender 30 in place. Surface 25 of the top 20 contacts surface 38 of the pin extender 30. Surface 26 of the top 20 contacts surface 37 of the pin extender 30. Surface 27 of the top 20 contacts surface 36 of the pin extender 30. Surface 28 of the top 20 contacts surface 35 of the pin extender 30. It should thus be appreciated that the top 20 includes an inwardly protruding lip and the pin extender 30 includes an outwardly protruding shoulder that contacts and sits on the inwardly protruding lip.

Figure 9:
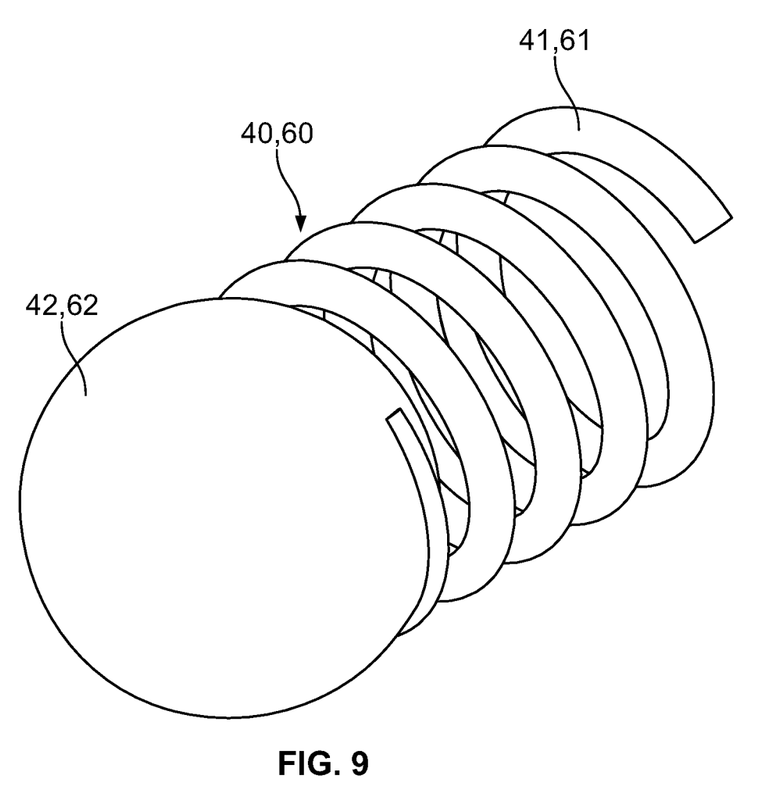
FIG. 9 is a perspective view of a stabilizer.

As shown in FIGS. 5 and 9, each of the plurality of first stabilizers 40 includes a spring or bias member 41 and a head 42. The head 42 may be spherical. One end of each spring 41 is attached to the pin extender 30 at an end of a respective stabilizer slot 33. Each head 42 is sized and configured to slide in one top head slot 55 defined in the pin receiver 50. The first stabilizers 40 are equally radially spaced from the centerline 400. Each first stabilizer 40 is separated from an adjacent stabilizer 40 by 90 degrees.

As shown in FIGS. 2 and 6, the top 20, the pin extender 30, and the first stabilizers 40 are permanently attached to the trailer hitch 100. The trailer hitch 100 includes a curved portion 120 that contacts, and is flush with, at least a portion of surface 23 of the top 20. The cup 70, the second stabilizers 60, and the pin receiver 50 are permanently attached to the trailer 200. Although the pin receiver 50 is permanently attached to the trailer 200, the pin receiver 50 is floating and may thus (a) rotate in cup 70 about centerline 400 and longitudinally slide in cup 70 along centerline 400. When the vehicle 300 is not hitched to the trailer 200, the pins 32 and the first stabilizers 40 protrude or hang from the pin extender 38 inside of the trailer hitch 120. Thus, a cap (not shown) may be connected to the trailer hitch and/or the top 20 and/or the pin extender 30. The cap may include some or all of the features of the pin receiver 50 and thus be configured to cover the pins 32 and compress the first stabilizers 40.

As shown in FIGS. 2 and 5, the pin receiver 50 at least partially sits within cup 70. While sitting in cup 70, the pin receiver 50 is configured to rotate within cup 70 about the centerline 400 and is configured to longitudinally slide along centerline 400. The pin receiver 50 defines pin slots 56, top head slots 55, bottom head slots 57, and a central void 58. The top head slots 55 are kidney shaped with flat bottoms. The heads 42 of the first stabilizers 40 press against the flat bottoms. The bottom head slots 57 are kidney shaped with flat tops. The bottom head slots 57 receive the second stabilizers 60. The second stabilizers 60 press against the flat tops of the bottom head slots 57.

The top head slots 55 enable circumferential movement (about centerline 400) of the first stabilizers 40 with respect to the pin receiver 50. The bottom head slots 57 enable circumferential movement (about centerline 400) of the second stabilizers 60 with respect to the pin receiver 50. It should be appreciated that while four top head slots 55 and four bottom head slots 57 are shown, more or less head slots can be provided. In particular, each of the top and bottom head slots 55, 57 may be a single continuous circular groove extending about an entire circumference.

As shown in FIG. 5, a single reference circumference about centerline 400 intersects all of the top head slots 55. A single reference circumference about centerline 400 intersects all of the pin slots 56. A single reference circumference about centerline 400 intersects all of the bottom head slots 57.

As shown in FIG. 5, the pin receiver 50 includes a first generally flat surface 54 that defines the top head slots 55 and the pin slots 56, a ring shaped second surface 53 meeting the first generally flat surface 54 at a circumferential edge, a ring shaped third surface 52 meeting the ring shaped second surface 53 surface at a circumferential edge, and a ring shaped fourth surface 51 meeting the ring shaped third surface 52 at a circumferential edge. A cylindrical stabilizer 59 extends from a flat bottom surface of the pin receiver 50. As shown in FIG. 1b, upon assembly, a circumferential gap 11 at least partially separates the top 20 from the cup 70. The pin receiver 50, and more specifically, surface 53 of the pin receiver 50, is viewable through the circumferential gap 11.

Wires extending from the trailer 200 and through the cup 70 are received in the central void 58. Each of the wires is connected to a suitable location (e.g., via soldering) in central void 58. Each of the wires thus electrically communicates with a single pin slot 56 bottom and thus a single pin 32.

As shown in FIGS. 2 and 5, the second stabilizers 60 are similar to the first stabilizers 40. The springs 61 of the second stabilizers 60 are fixed to bottoms of stabilizer slots 74 defined in cup 70. Similar to the heads 42 of the first stabilizers 40, the heads 62 of the second stabilizers 60 are free to move within the bottom head slots 57.

As shown in FIGS. 2 and 5, the cup 70 includes a base 71, which is fixed to the trailer 200, a neck 72, and a bowl 73. The bowl 73 defines the stabilizer slots 74, a pin extender void 75, a pin path void 76, and a wire hole 77. Wires extending from the trailer 200 pass through the wire hole 77, through the pin path void 76, and into the central void 58 of the pin receiver 50. The pin path void 76 includes a dome shaped first portion 76a, a cylindrical second portion 76b, a cylindrical third portion 76c, and a ring shaped fourth portion 76d. The ring shaped fourth portion 76d has a circumferential bottom surface lower than a bottom surface of the cylindrical third portion 76c.

The bowl 73 includes a first partially spherical surface 73, a second flat ring shaped surface 73b, a third ring shaped surface 73c, a fourth flat ring shaped surface 73d, and a ring shaped fifth surface 73e.

As shown in FIG. 2, upon assembly, the pin receiver 50 fits into the pin receiver void 75. Cylindrical stabilizer 59 fits into the ring shaped fourth portion 76d. Although FIG. 2 shows the bottom of cylindrical stabilizer 59 being in contact with the bottom surface of cup 70 defining ring shaped fourth portion 76d, in practice ring shaped fourth portion 76d may be deeper to enable vertical downward movement of cylindrical stabilizer 59.

As shown in FIGS. 2 and 5, opposing sides of the bowl 73 defining the ring shaped fourth portion 76d press against the cylindrical stabilizer 59. The ring shaped fifth surface 73e of the cup 70 presses against the ring shaped fourth surface 51 of the pin receiver 50. The ring shaped surface 73d serves as a stop for the pin receiver 50 and is thus configured to restrain the stabilizer (upon sufficient upward movement pin receiver 50 along centerline 400) by contacting ring shaped third surface 52 of pin receiver 50. The third ring shaped surface 73c presses against ring shaped second surface 53 of pin receiver 50. The bowl 70 may be packed with grease or lubricant, which may lie between surfaces of the bowl 70 and the corresponding surfaces of the pin receiver 50.

As previously discussed, the pin receiver 50 is configured to (a) rotate within bowl 70 about centerline 400 and (b) slide or translate within bowl 70 along centerline 400. The stabilizers 40, 60 oppose such sliding or translation of the pin receiver 50 with respect to the bowl 70 along centerline 400 and are thus configured to reset the position of the receiver 50. According to some embodiments, the stabilizers 40, 60 do not interfere with rotation of the pin receiver 50 with respect to the bowl 70 by sliding in the kidney slots 55, 57 during rotation of the pin receiver 50 with respect to the bowl 70.

During operation, the vehicle 300 (and thus the trailer hitch 100) will execute a turn prior to the trailer 200. The top 20 and the pin extender 30 will turn with the vehicle 300. The pin receiver 50, by virtue of the pins 32, will turn with the pin extender 30 and rotate within the pin receiver void 75 of the cup 70. Because the top head slots 55 are kidney shaped, the first stabilizers 40 will remain vertically aligned along centerline 400. Because the bottom head slots 57 are kidney shaped, the second stabilizers 60 will likewise remain vertically aligned along centerline 400. Thus, the kidney shaped configurations of the slots 55, 57 prevents the stabilizers 40, 60 from slanting with respect to centerline 400. Such slanting could damage the stabilizers 40, 60.

During rotation, however, the first stabilizers 40 will become offset with respect to the second stabilizers 60 since the first stabilizers 40 will rotate with the vehicle 300 and the trailer hitch 200 while the second stabilizers will remain aligned with the trailer 200. Upon the trailer 200 fully executing the turn and returning to parallel with the vehicle 300, the first and second stabilizers 40, 60 will return to their non-offset positions of FIGS. 2 and 5.

During operation, the vehicle 300 will vertically shift with respect to the trailer 200. More specifically, when the vehicle 300 hits a bump, the vehicle 300 will bounce vertically upwards while the trailer 200 remains vertically stable. The first and second stabilizers 40, 60 are configured to maintain firm engagement between the pin extender 30 (which is attached to the vehicle 300) and the pin receiver 50 (which is attached to the trailer 200) when vehicle 300 vertically shifts with respect to trailer 200.

For example, when vehicle 300 shifts vertically upwards with respect to trailer 200, the second stabilizers 60 will bias the pin receiver 50 vertically upwards (along centerline 400), thus keeping the pins 32 in firm contact with the bottom surfaces of the pin slots 56. When vehicle 300 shifts vertically downwards with respect to trailer 200, the first stabilizers 40 will bias pin receiver 50 vertically downwards and the second stabilizers 60 will accommodate downward movement, thus preventing the pins 32 from excessively compressing (and shattering) against the bottom surfaces of the pin slots 56.

The invention claimed is:

1. A coupler assembly comprising:
   a pin extender comprising electrical pins and first slots;
   a pin receiver comprising pin slots and second and third slots;
   a housing comprising fourth slots;
   first stabilizers disposed in the first and second slots;
   second stabilizers disposed in the third and fourth slots;
   wherein each stabilizer comprises a spring and a solid head, and the electrical pins are disposed in the pin slots.

2. The assembly of claim 1, wherein the first slots are cylindrical and the second slots are kidney shaped.

3. The assembly of claim 2, wherein the third slots are kidney shaped and the fourth slots are cylindrical.

4. The assembly of claim 3, wherein each spring is fixed with one of the solid heads and the solid heads are spherical.

5. The assembly of claim 3, wherein the second slots and third slots are sized to enable a rotation of the pin receiver with respect to the first and second stabilizers.

6. The assembly of claim 5, wherein the rotation of the pin receiver with respect to the first and second stabilizers does not compress or tension any of the first and second stabilizers.

7. The assembly of claim 1, wherein the housing is a cup defining a central void and the pin receiver is at least partially disposed in the central void.

8. The assembly of claim 7, wherein the pin receiver is rotatable and longitudinally slideable within the central void.

9. The assembly of claim 8, wherein the first and second stabilizers oppose longitudinal movement of the pin receiver within the central void.

10. The assembly of claim 9, wherein the cup comprises a base, a neck, and a bowl, the neck being narrower than both of the base and the bowl.

11. The assembly of claim 7, wherein the cup comprises a lip that prevents the pin receiver from leaving the central void.

12. The assembly of claim 1, further comprising a top disposed above the pin extender, the top comprising a plurality of masts.

13. The assembly of claim 12, wherein the top comprises a first wire port, the pin extender comprises a second wire port, and the wire ports are aligned.

14. The assembly of claim 13, wherein the top at least partially houses the pin extender.

15. The assembly of claim 1 wherein a number of the first slots, a number of the second slots, and a number of the first stabilizers are all equal to each other.

16. The assembly of claim 1, wherein the pin extender is attached to a vehicle and the housing is attached to a trailer.

17. The assembly of claim 1, wherein a top-most surface of the pin extender is dome-shaped.

18. The assembly of claim 1, further comprising first wires extending through the housing and into the pin receiver.

19. The assembly of claim 18, further comprising second wires extending through the pin extender.

20. The assembly of claim 19, wherein each of the first wires are in communication with at least one of the second wires via the electrical pins.

* * * * *